United States Patent [19]

Batson et al.

[11] Patent Number: 5,699,267

[45] Date of Patent: Dec. 16, 1997

[54] HOT GAS EXPANDER POWER RECOVERY AND CONTROL

[75] Inventors: Brett W. Batson, Dallas Center; Byron K. Broussard, West Des Moines, both of Iowa

[73] Assignee: Compressor Controls Corporation, Des Moines, Iowa

[21] Appl. No.: 398,001

[22] Filed: Mar. 3, 1995

[51] Int. Cl.$^6$ ............................................. G05B 13/02
[52] U.S. Cl. ............................ 364/492; 364/148; 364/164
[58] Field of Search ............................ 290/52; 364/148, 364/149, 150, 164, 165, 492

[56] References Cited

U.S. PATENT DOCUMENTS

| | | | |
|---|---|---|---|
| 4,445,180 | 4/1984 | Davis et al. | 364/492 |
| 4,886,978 | 12/1989 | Kawamura | 290/52 |
| 4,916,328 | 4/1990 | Culp, III | 307/39 |
| 5,323,330 | 6/1994 | Asplund et al. | 364/494 |
| 5,543,667 | 8/1996 | Shavit et al. | 307/39 |

*Primary Examiner*—Edward R. Cosimano
*Attorney, Agent, or Firm*—Henderson & Sturm

[57] ABSTRACT

A method and apparatus are disclosed for preventing overspeed of a hot gas expander and its resultant load when the load (or a portion of it) is shed suddenly. In this situation, power applied by the expander to the shaft must be reduced, but normal feedback to the speed controller may be too slow to be effective. The load rejection may be sensed by a feedforward system before a significant speed increase is detected by the speed control loop. For this approach, the expander can be instrumented with either a flow measurement device, a downstream pressure, or a downstream temperature. Inlet pressure and inlet temperature are required. The method uses the characteristic map describing the expander (shaft power versus mass flow rate) along with a feedforward control action to anticipate the speed increase. By using dimensional analysis, the characteristic curves will collapse into single curves describing the parameters of reduced flow, reduced power, and pressure ratio. Speed increase can now be largely avoided by employing the resultant values from any of the pairs of reduced power relationships (reduced power versus reduced flow rate squared, reduced power versus pressure ratio, and reduced power versus temperature ratio). The reduced flow rate needed to keep the expander and its loads from increasing speed can now be correlated to a valve position resulting in the reduced flow required to maintain speed. This valve position setpoint is applied as an open loop step change.

42 Claims, 13 Drawing Sheets

Expander characteristics

"Dimensionless" Expander characteristics

"Dimensionless" Expander characteristics replacing flow with pressure ratio $$\dot{m} = f(\Delta p_o, T, p)$$

Fig. 17

$$\dot{m} = C\sqrt{\frac{\Delta p_o p}{T}}$$

Fig. 18

$$R_c = \frac{p_1}{p_2}$$

$$q_r = f(R_c)$$

$$\dot{m} = Cq_r \frac{p}{\sqrt{T}}$$

Fig. 19

HOT GAS EXPANDER POWER RECOVERY AND CONTROL

TECHNICAL FIELD

This invention relates generally to a control method and apparatus for controlling the rotational speed of a hot gas expander, using a model based approach. More particularly, it relates to a method which anticipates the speed increase attributed to a sudden rejection of load.

BACKGROUND ART

The operation of recovering hot gases for use by expanders not only adds supplementary drivers to the process, it also results in cost savings. Present-day high cost of energy mandates that "waste" energy (often discarded) be salvaged and used to drive electric generators, compressors, and pumps.

Expander speed is inherently variable, and even a "constant speed" application such as electric power generation must be brought up to speed and shutdown again. Therefore, control of the rotational speed of an expander is important during at least some of its operation.

When at least one of the loads driven by an expander is a synchronous or induction generator, there is the possibility of a very sudden rejection of load. A similar scenario is possible during the surge of a process compressor driven by an expander. Under these load shedding conditions, it is important to maintain a fairly constant speed to avoid overspeed, or for the sake of the process (in the case of one of the loads being a compressor, a generator, or a pump). For the above reasons, there is a need to easily and accurately control the rotational speed of expanders during certain critical control conditions.

DISCLOSURE OF THE INVENTION

The purpose of this invention is to provide a control method for hot gas expanders that anticipates the shedding of a known power. This method employs the use of dimensional analysis applied to the characteristic maps that describe the expander (reduced power versus reduced flow rate or pressure ratio) together with a feedforward control action.

When the load (or a portion of it) on an expander is shed suddenly—following a breaker trip or compressor surge—the event may be sensed before the ensuing speed increase is detected by the speed control loop. In this situation, power applied by the expander to the shaft must be reduced. A feedforward approach can be employed to anticipate this requirement for control action before the feedback system indicates the need.

Open-loop control can be applied, but an intelligent application of this type of control should be made regarding how much to reduce the power. The intent is to balance the power applied to the shaft with the power absorbed on the shaft, to maintain a constant speed, as described in the equation $$\frac{I}{2} \frac{dN^2}{dt} = P^+ - P^-$$

where:
I=moment of inertia
N=rotational speed
$P^+$=power added by the driver(s) on the shaft
$P^-$=power absorbed by the load(s) on the shaft It can be seen from the equation that speed will not change with time if the power applied to the shaft is exactly absorbed by the load(s). However, this equation also describes the rotational dynamics when these powers are not balanced. As mentioned, the intent is to balance the power applied to the shaft with the power absorbed—making the right-hand side of the equation close to zero, thereby keeping the speed under tight control.

Following through with the open-loop approach, this invention warns the speed control function of load loss and of impending speed increase. Next, it estimates the magnitude of the load lost. With a generator, a measure of the actual power produced the instant before breaker opening will suffice. For a compressor in surge, a computation of the polytropic power divided by the appropriate efficiency is sufficient.

The feedforward control action comprises three scenarios:

(1) Expander with Flow Measurement—Initially, reduced flow is calculated and reduced power is subsequently determined (using characteristic maps). From this power value, shaft power is calculated knowing the inlet conditions of pressure and temperature. The value of power rejected is then subtracted from the shaft power (the power being absorbed on the shaft). Next, the value of reduced power corresponding to this required power, is calculated. The value of reduced flow is now determined, representing the reduced flow rate needed to keep the expander and its loads from increasing speed. The required flow rate can be correlated to a valve position using the valve's characteristics.

(2) Expander with Downstream Pressure Measurement— The value of pressure ratio across the expander is required, and reduced power is then determined. The value of power can be calculated as in the preceding scenario, and the power which was shed subtracted from it. The process continues as above, resulting in the reduced flow rate required to maintain speed, and a valve position set point for the open-loop step.

(3) Expander Valve as a Function of Load Power—A mapping between the expander inlet valve position and the power of the driven load is constructed. When load rejection (partial or full) occurs, the required valve position is determined based on this mapping.

Once these three feedforward scenarios are initiated, closed-loop control will be applied to overcome any remaining errors.

BRIEF DESCRIPTION OF THE DRAWINGS

FIG. 17 shows an equation for calculating mass flow rate as a function of $\Delta p_o$, T, and p.

FIG. 18 shows an equation for calculating a value proportional to mass flow rate.

FIG. 19 shows a flow diagram for the calculation of mass flow rate, using $R_c$ and $q_r$.

BEST MODE FOR CARRYING OUT THE INVENTION

To prevent overspeed of a hot gas expander and its resultant load (e.g., electric generator, compressor, or pump), the expander's rotational speed must be accurately controlled. Overspeed occurs when the expander's load (or a portion of it) is shed suddenly, resulting from a breaker trip or compressor surge. The balanced relationship of the power added ($P^+$) by the driver(s) on the shaft, and the power absorbed ($P^-$) by the load(s) on the shaft, is shown as $$\frac{1}{2} \frac{dN^2}{dt} = P^+ - P^-$$

Since $P^-$ drops off upon load rejection, the only way to avoid increasing the rotational speed (N) is to decrease $P^+$ to keep the right-hand side of the equation near zero; thus, maintaining a fairly constant speed for the sake of avoiding overspeed, or for the sake of the process should the load be a compressor, a generator, or a pump. Normal feedback to the speed controller may be too slow to be effective; however, this load shedding event may be sensed by a feedforward system before a significant speed increase is detected by the speed control loop. This invention uses such a feedforward approach to anticipate and avoid a speed increase during load rejection conditions.

Figure 1:
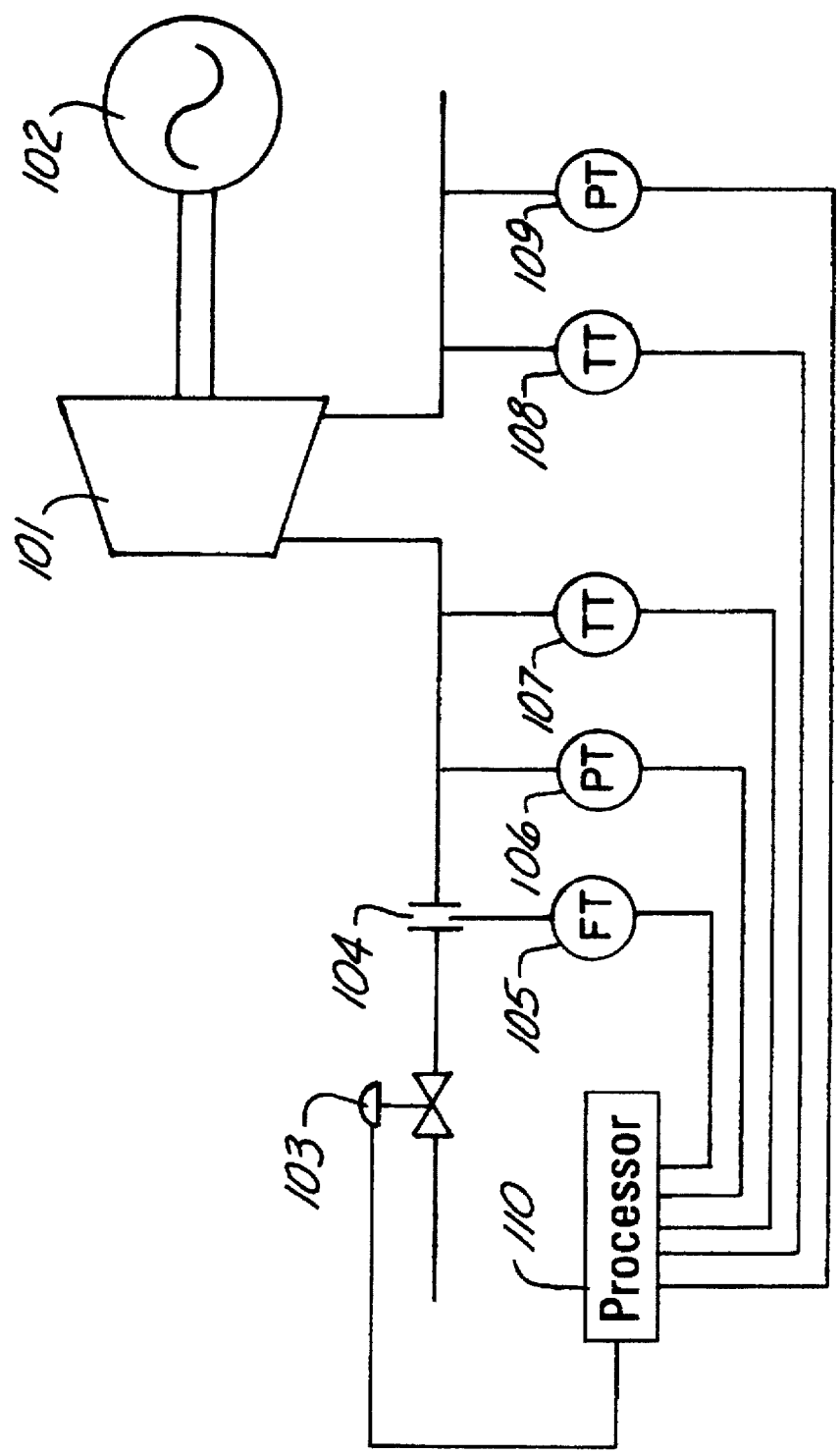
FIG. 1 shows a power recovery system comprising a hot gas expander and instrumentation (measuring devices).

FIG. 1 depicts a power recovery system consisting of a hot gas expander 101, a load 102, a control valve 103, an orifice plate 104, and instrumentation which includes a flow rate transmitter 105, an inlet pressure transmitter 106, an inlet temperature transmitter 107, an outlet temperature transmitter 108, and an outlet pressure transmitter 109. Each of the signals (104) through (109) is received into processor (110), which calculates an estimate of the expander power.

Figure 2:
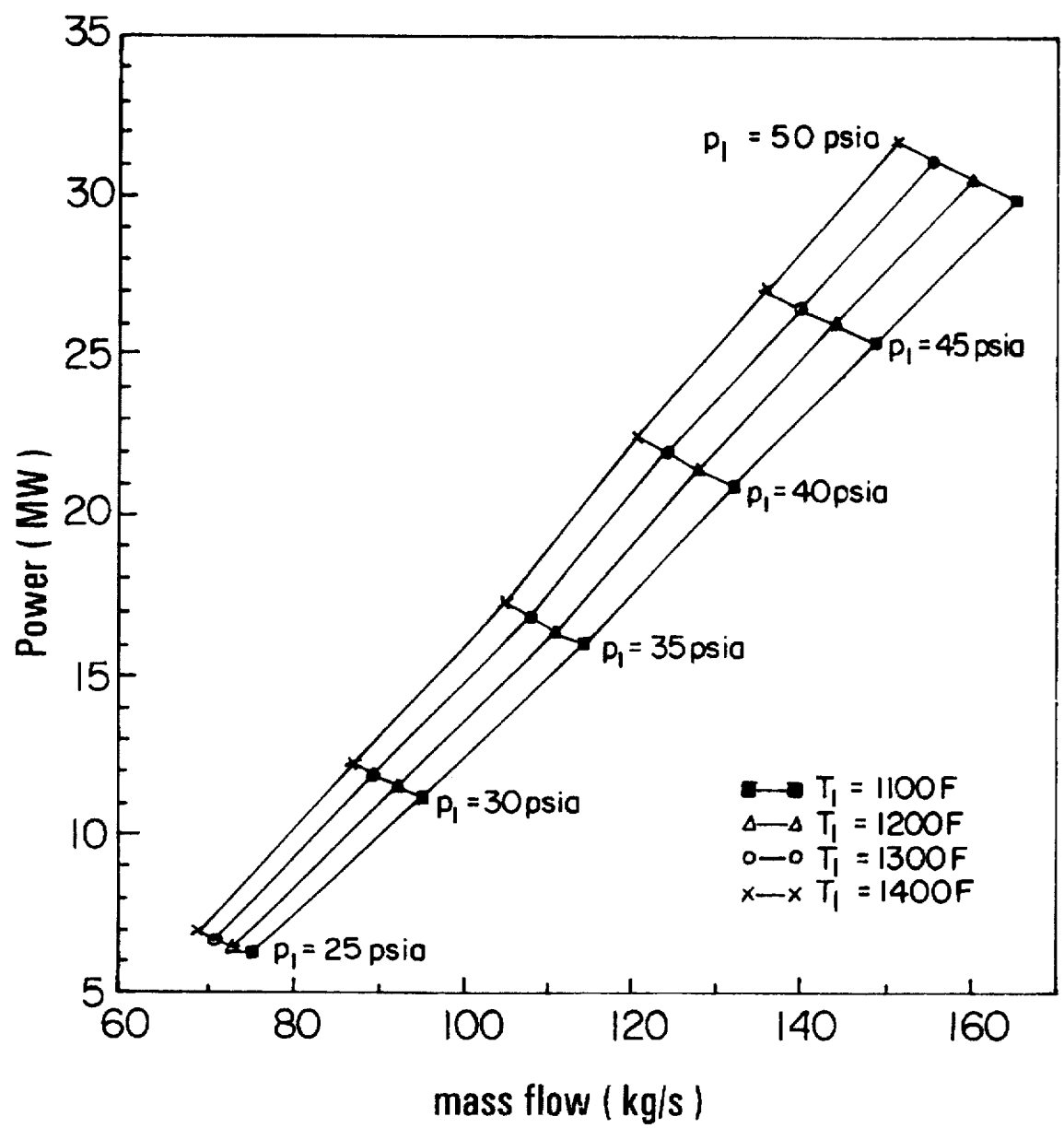
FIG. 2 shows a typical characteristic map for a hot gas expander depicting shaft power versus mass flow rate.

FIG. 2 shows a typical characteristic map for a hot gas expander, depicting shaft power versus mass flow rate and consisting of four parameters: mass flow rate, power, inlet pressure, and inlet temperature. These expander characteristics are typically a weak function of rotational speed. When the influence of rotational speed is significant, a third dimension can be added, being Equivalent Speed:

$$N_e = \frac{N}{\sqrt{ZRT_1}}.$$

Figure 3:
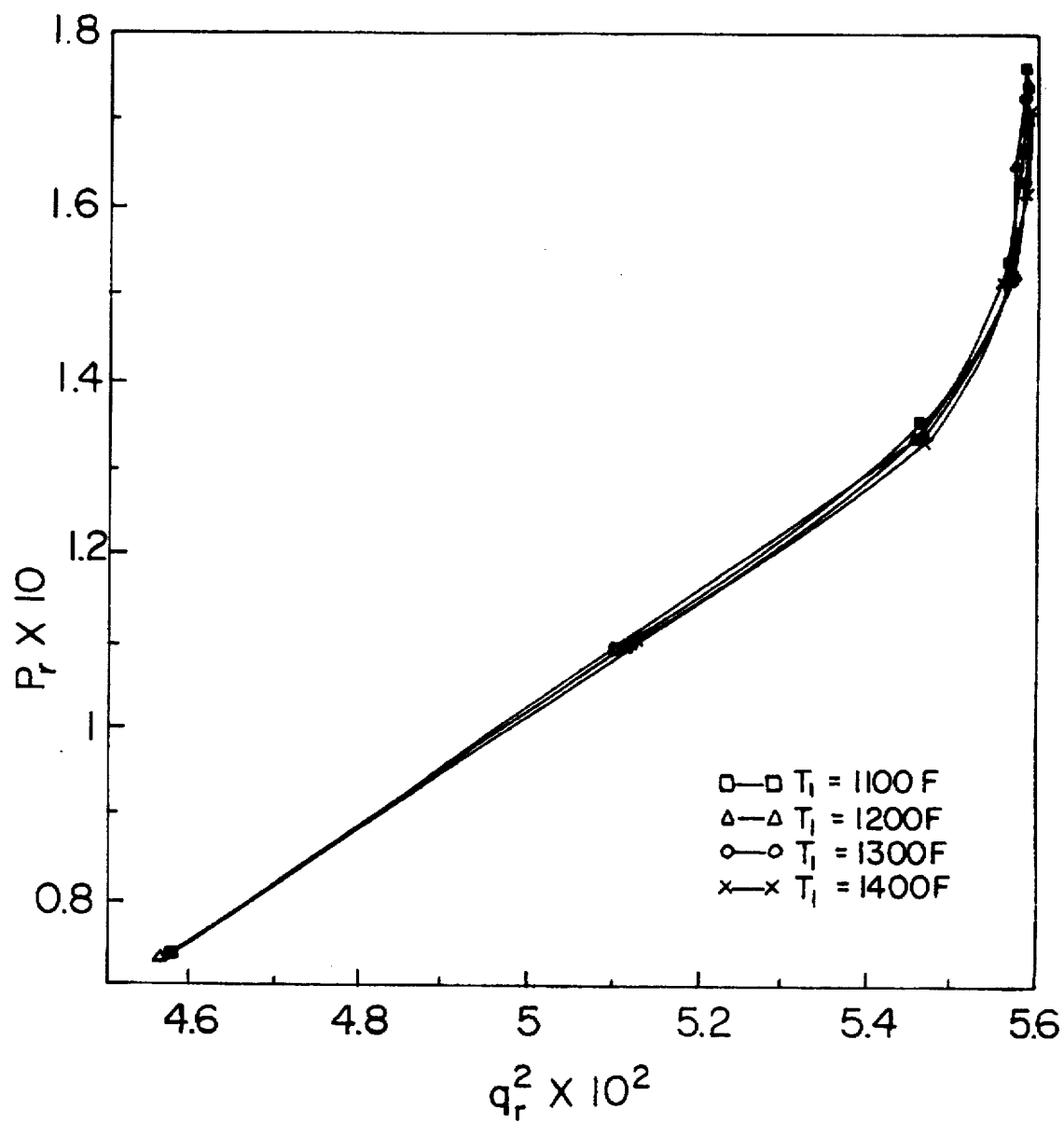
FIG. 3 shows a hot gas expander map (reduced power versus reduced flow rate squared) obtained through dimensional analysis.
Figure 4:
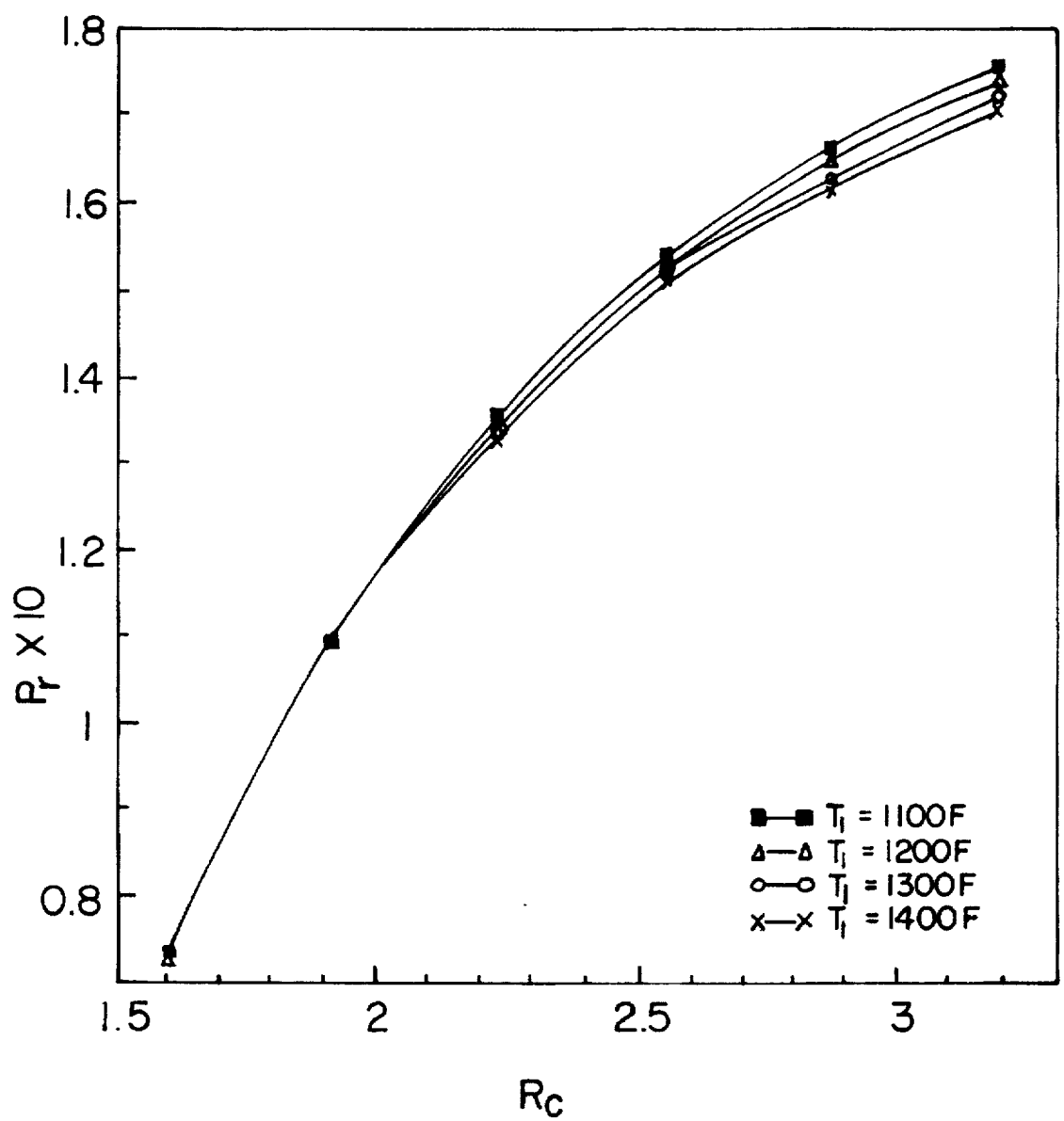
FIG. 4 shows a hot gas expander map (reduced power versus pressure ratio) obtained through dimensional analysis.
Figure 5:
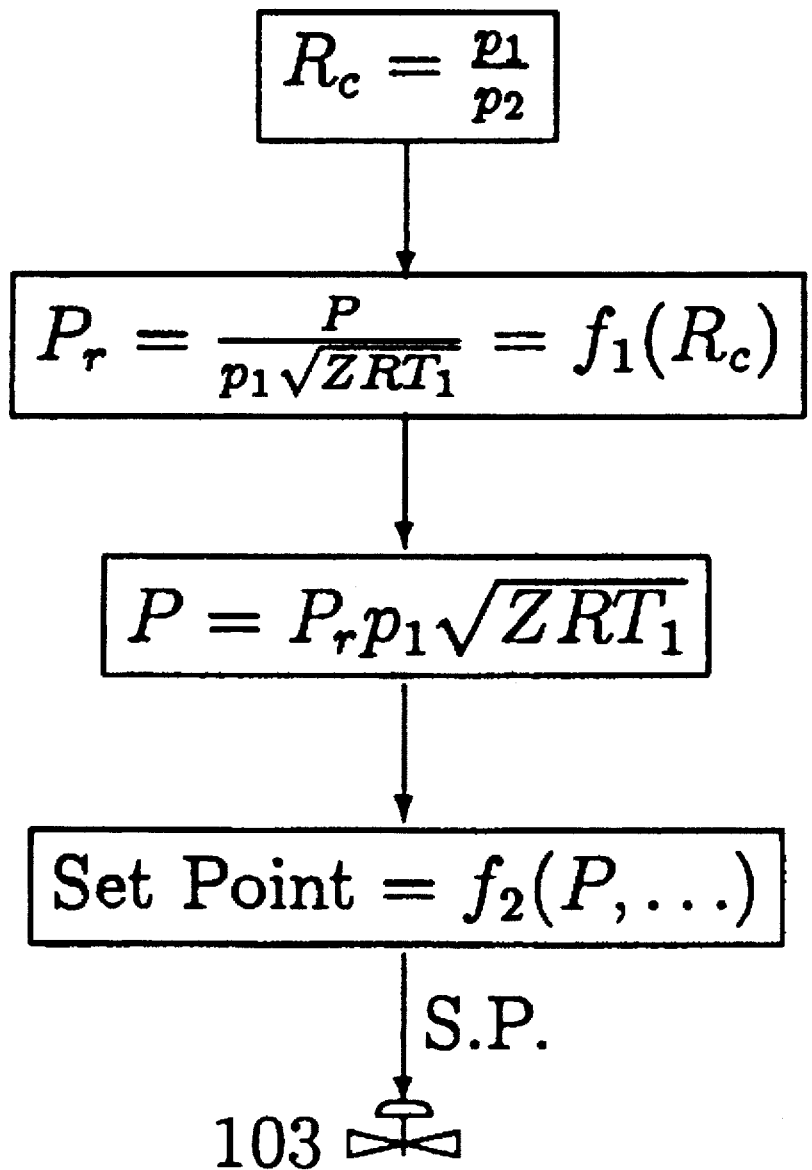
FIG. 5 shows a flow diagram for calculating a set point to adjust a power control using $R_c$.
Figure 6:
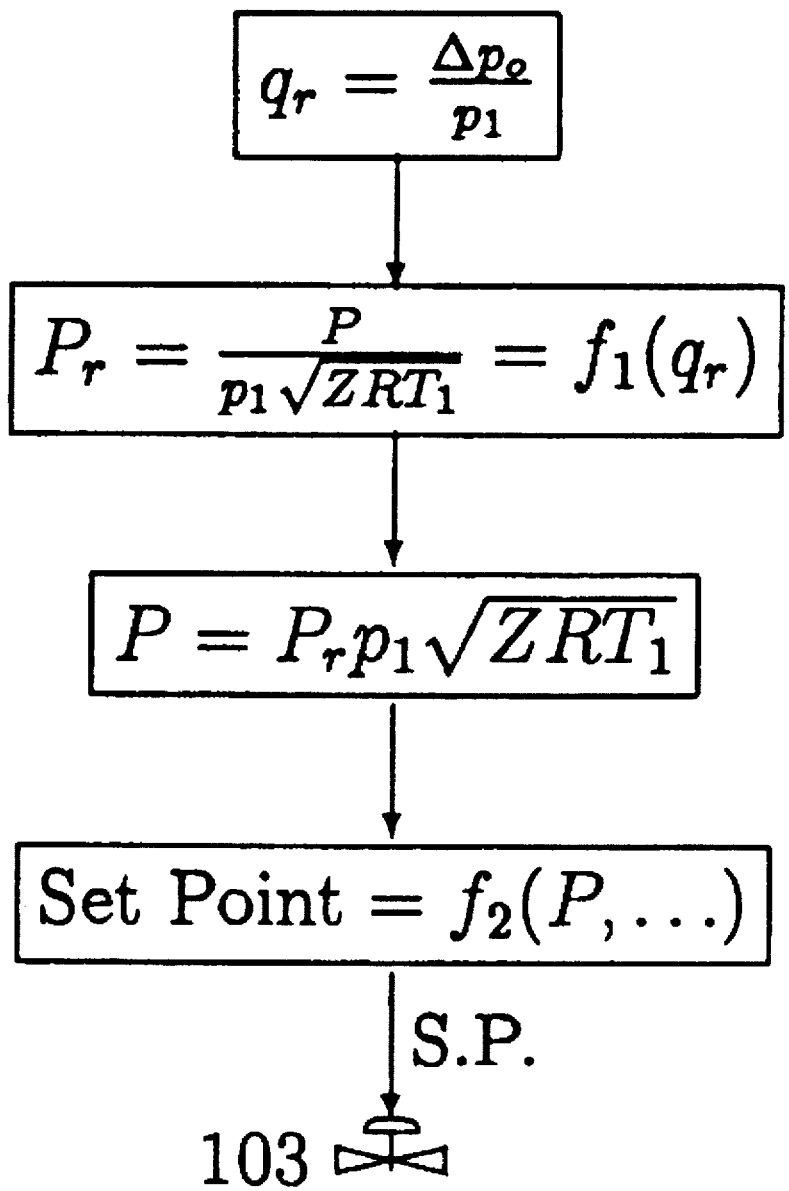
FIG. 6 shows a flow diagram for calculating a set point to adjust a power control element, using $q_r$.
Figure 7:
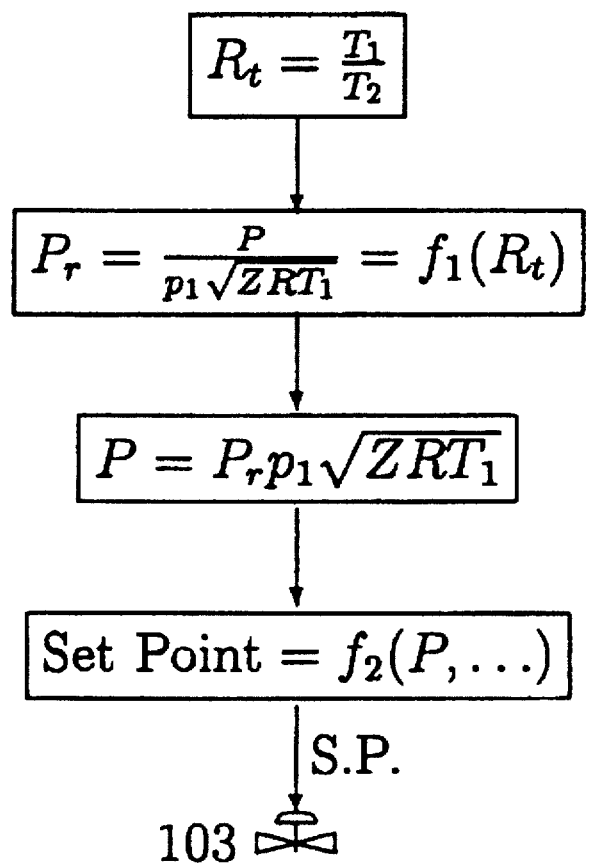
FIG. 7 shows a flow diagram for calculating a set point to adjust a power control element, using $R_r$.
Figure 8:
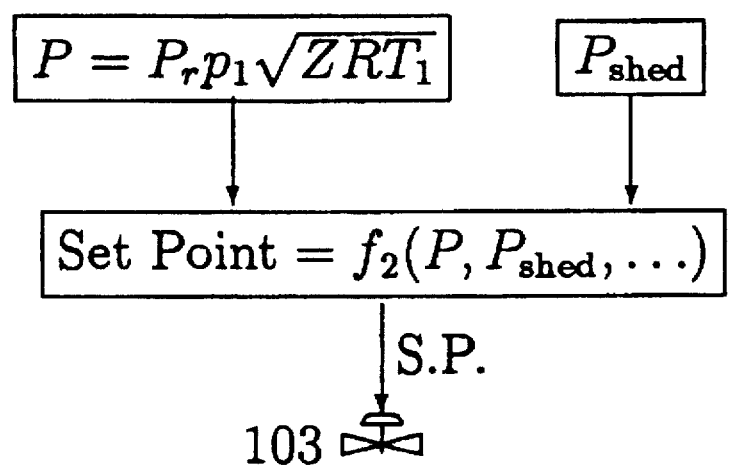
FIG. 8 shows a flow diagram for calculating a set point to adjust a power control element, using P and $P_{shed}$.
Figure 9:
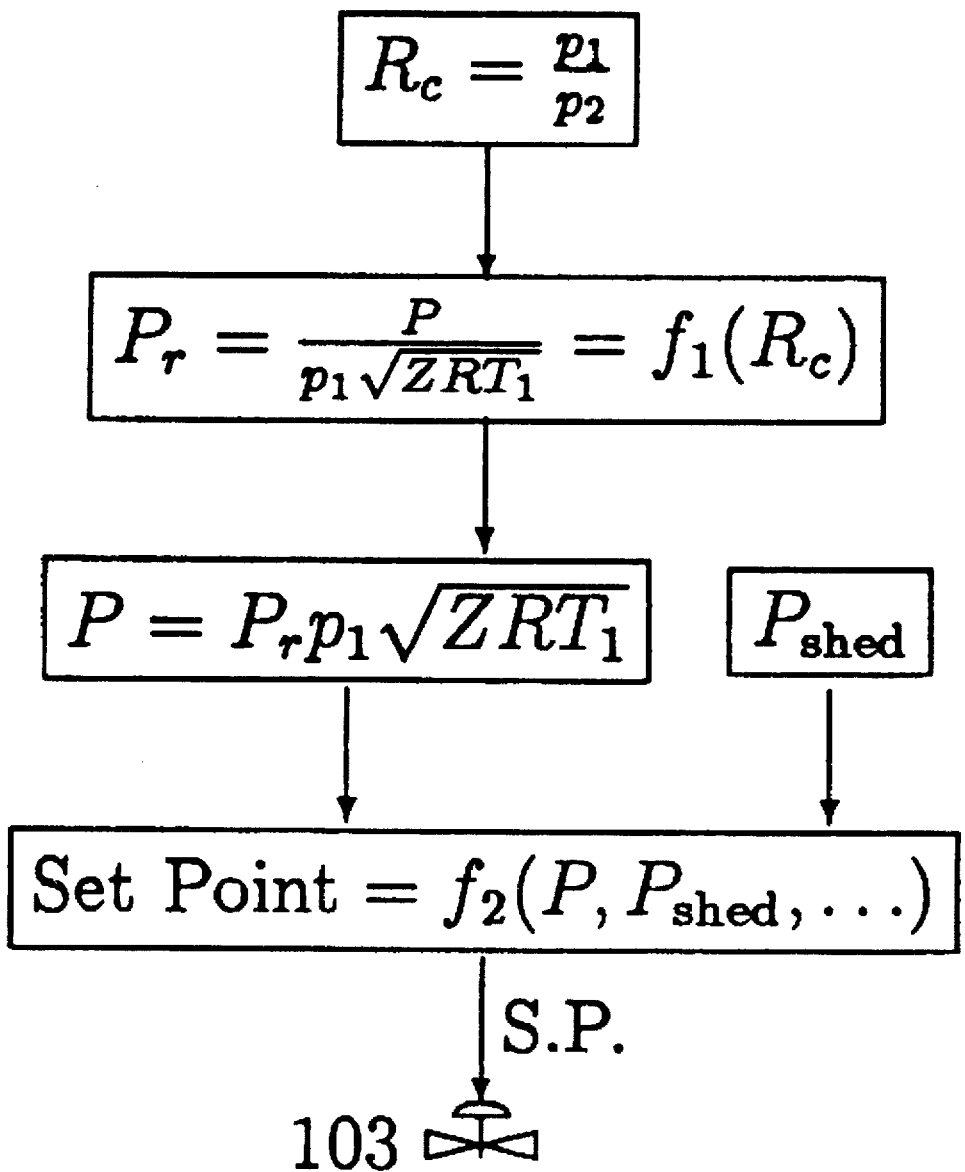
FIG. 9 shows a flow diagram for calculating a set point to adjust a power control element, using $R_c$ and $P_{shed}$.
Figure 10:
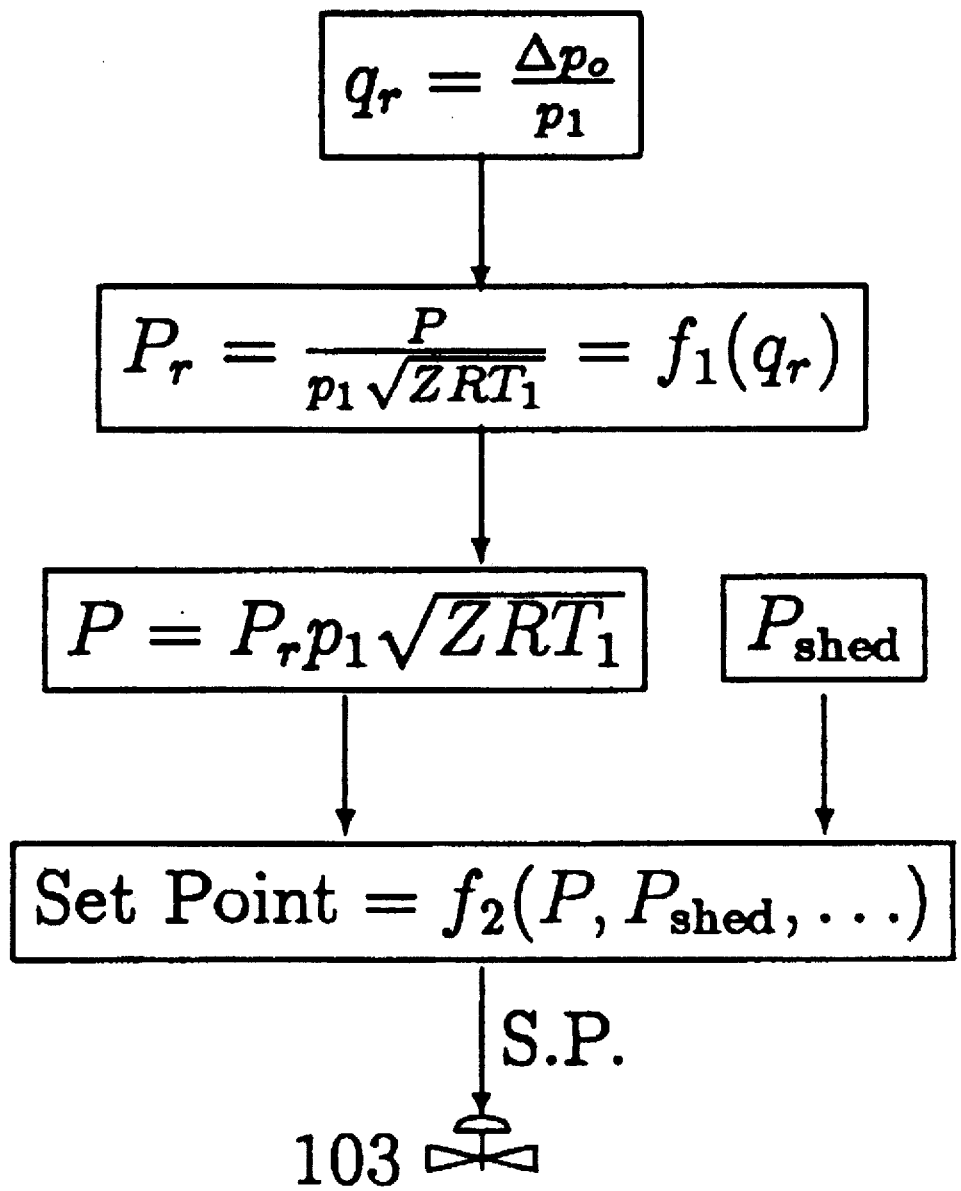
FIG. 10 shows a flow diagram for calculating a set point to adjust a power control element, using $q_r$ and $P_{shed}$.
Figure 11:
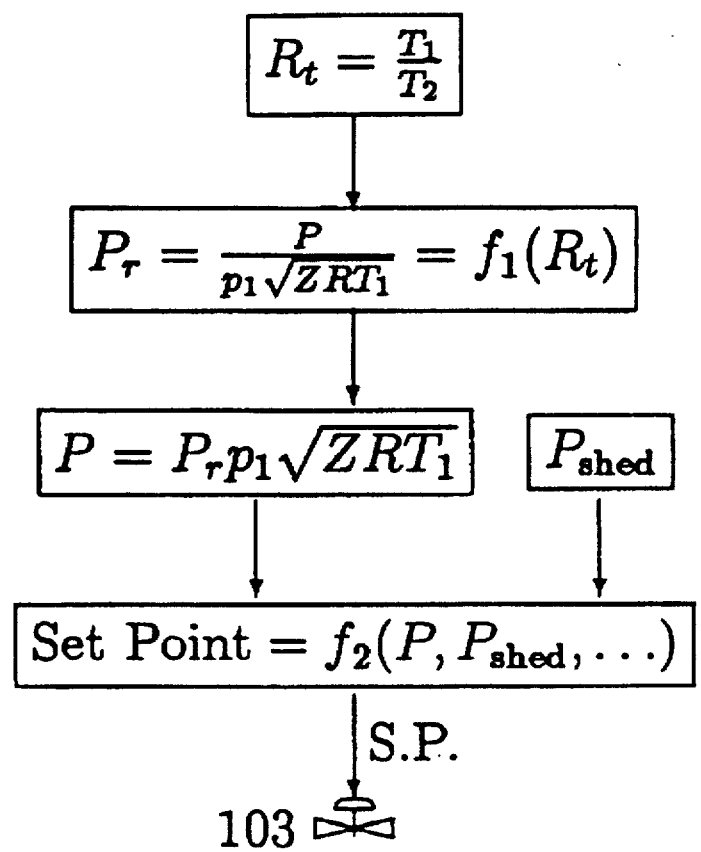
FIG. 11 shows a flow diagram for calculating a set point to adjust a power control element, using $R_c$ and $P_{shed}$.
Figure 12:
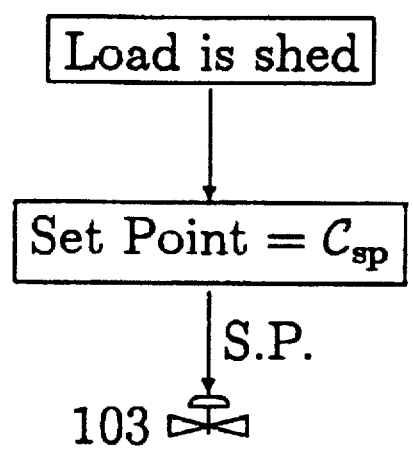
FIG. 12 shows a flow diagram for adjusting a power control element, using a predetermined set point value, $C_{sp}$.
Figure 13:
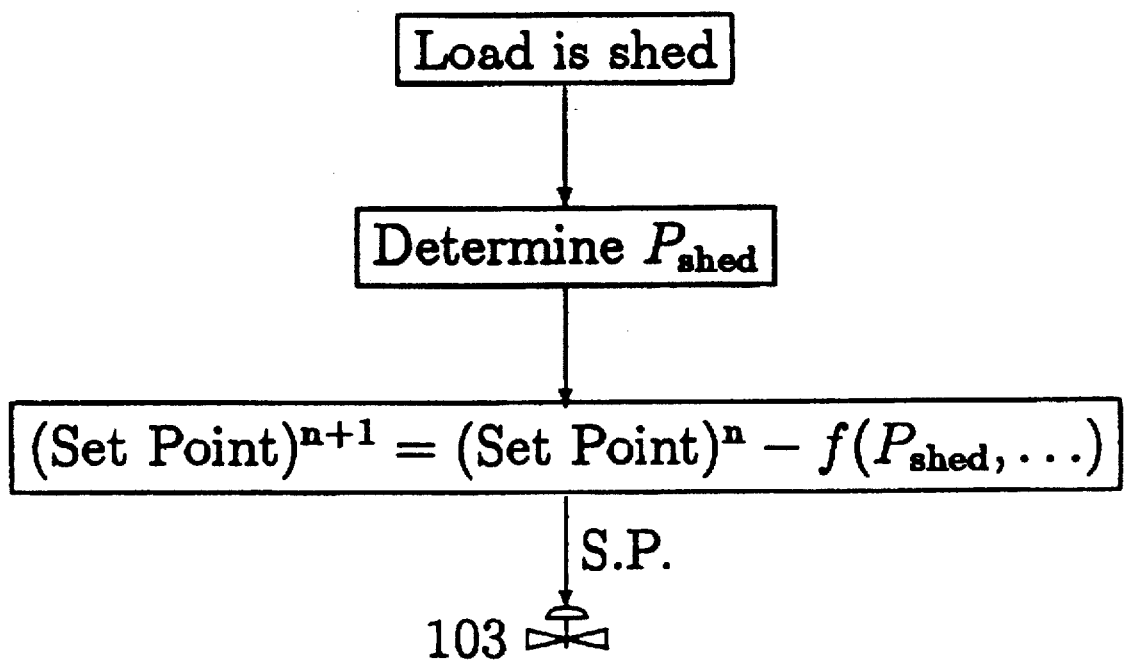
FIG. 13 shows a flow diagram for decrementing a power control element set point, by a value based on $P_{shed}$.
Figure 14:
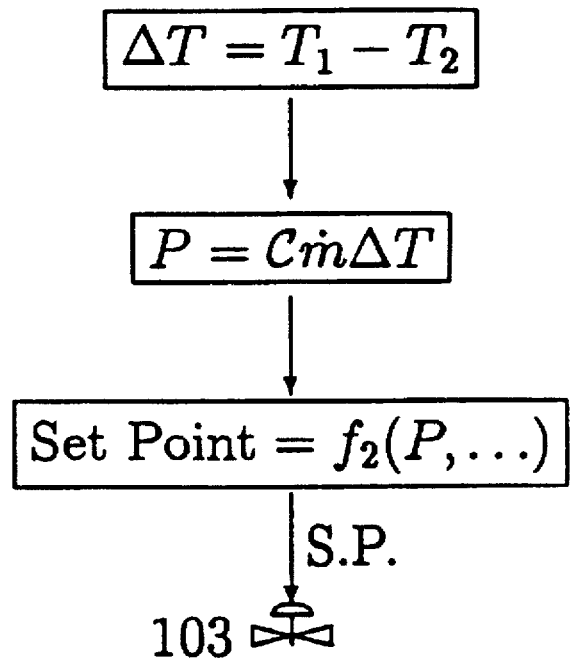
FIG. 14 shows a flow diagram for calculating a set point to adjust a power control element, using $\Delta T$ and $\dot{m}$.
Figure 15:
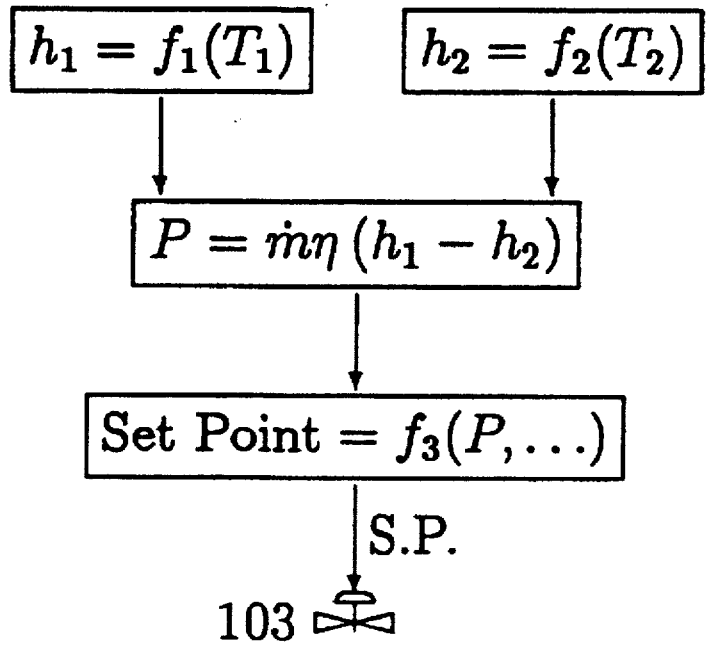
FIG. 15 shows a flow diagram for calculating a set point to adjust a power control element, using $h_1$ and $h_2$ as functions of $T_1$ and $T_2$, respectively.
Figure 16:
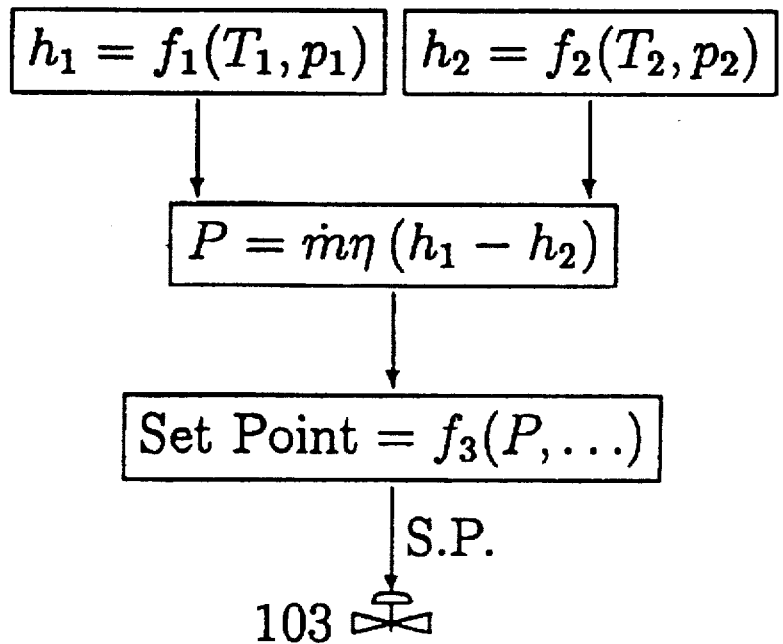
FIG. 16 shows a flow diagram for calculating a set point to adjust a power control element, using $h_1$ and $h_2$ as functions of $T_1,p_1$ and $T_2,p_2$, respectively.

By using dimensionless parameters obtained through dimensional analysis (similitude), the data will collapse into a single curve (shown in FIGS. 3 and 4), and the useful parameters are $$\text{Reduced Flow } q_r = \frac{\dot{m}\sqrt{ZRT_1}}{p_1} = K\sqrt{\frac{\Delta p_{o,1}}{p_1}}$$

$$\text{Pressure Ratio } R_c = \frac{p_1}{p_2}$$

$$\text{Reduced Power } P_r = \frac{P}{p_1\sqrt{ZRT_1}}$$

$$\text{Equivalent Speed } N_e = \frac{N}{\sqrt{ZRT_1}}$$

where:
 $\dot{m}$=mass flow rate
 z=compressibility
 R=gas constant ($R_u$/MW)
 $R_u$=universal gas constant
 MW=molecular weight
 $T_1$=inlet temperature
 $p_1$=inlet pressure
 $p_2$=outlet pressure
 K=constant
 $\Delta p_{o,1}$=inlet flow-measurement signal
 P=power
 N=rotational speed Reduced Flow, Pressure Ratio, Reduced Power, and Equivalent Speed are nearly invariant to changes in inlet conditions. Note that these parameters are not truly dimensionless; however, since the geometry of the expander is fixed, dimensions of length can be eliminated by a constant characteristic length. Constants can be dropped and ignored for the purpose of this invention.

Because pressure is also changing in FIG. 2, a map (FIG. 4) can be constructed showing the relationship between the pressure ratio across the expander and the reduced power associated with it.

The implementation of this invention enlists two approaches: expander with flow measurement, and expander with downstream pressure measurement. With a flow measurement, the approach is to calculate the value of reduced flow, $q_r$, then use FIG. 3 to determine reduced power, $P_r$. From this value, shaft power is calculated knowing the inlet conditions, $p_1$ and $T_1$. The value of power rejected is then subtracted from this power which is being absorbed on the shaft; thus, the power to be provided. The value of the reduced power, corresponding to this required power, is calculated; and the value of reduced flow at which such reduced power is realized, is extracted from FIG. 3. This is the reduced flow rate needed to keep the expander and its load(s) from increasing speed. The required flow rate can be correlated to a valve position using the valve's characteristics.

The mode of an expander with a downstream pressure measurement, requires two maps. The value of pressure ratio across the expander is required, and FIG. 4 can be used to determine the reduced power at this point. The value of power can be calculated and the power which was shed subtracted from it. Switching back to FIG. 3, the process continues as above, resulting in the reduced flow rate required to maintain speed, and a valve position set point for the feedforward response.

Using the valve manufacturers equations (or the ISA standard equation), it is seen that reduced flow is all that is needed to correlate the flow with $C_v$ (or valve position). The ISA equation is shown below in terms of Reduced Flow $$q_r = \frac{\dot{m}\sqrt{ZRT_1}}{p_{v,1}} = K_1 C_v \left(1 - K_2 \frac{\Delta p_v}{p_{v,1}}\right)\sqrt{\frac{\Delta p_v}{p_{v,1}}}$$

where:
$\Delta p_v$=valve flow-measurement signal
$p_{v,1}$=valve inlet pressure
$K_1$=constant
$K_2$=constant
$C_v$=valve flow coefficient Therefore, the required mass flow rate need not be known, and the new value of $C_v$ can be calculated as a function of the reduced flows (assuming that $\Delta p_v/p_{v,1}$ is constant):

$$\frac{C_{v,required}}{C_{v,present}} \cong \frac{q_{r,required}}{q_{r,present}}$$

As an alternative to measuring the inlet temperature, $T_1$, and the discharge pressure, $p_2$, determining one or both of these can be accomplished by estimating them. Examples of when they can be estimated instead of measured are:
when the inlet temperature does not change greatly during operation; and
when the expander discharges to atmospheric (or nearly atmospheric) pressure, so $p_2$ is approximately constant.

FIGS. 5–16 and 19 exhibit flow diagrams for calculating a set point to adjust a power control element, whereas FIGS. 17 and 18 show equations for calculating mass flow rate.

Obviously many modifications and variations of the present invention are possible in light of the above teachings. It is, therefore, to be understood that within the scope of the appended claims, the invention may be practiced otherwise than as specifically described.

We claim:
1. A method for estimating the power produced by a power recovery system comprising a hot gas expander, a load, a means for controlling the power produced by said hot gas expander, and instrumentation, the method comprising the steps of:
   (a) determining a characteristic curve for said expander as a function of a reduced power, $P_r$;
   (b) determining a pressure, $p_1$, upstream of said expander and generating a signal proportional to the upstream pressure;
   (c) determining a temperature, $T_1$, upstream of said expander and generating a signal proportional to the upstream temperature;
   (d) determining a pressure, $p_2$, downstream of said expander and generating a signal proportional to the downstream pressure;
   (e) calculating a pressure ratio, $R_c=p_1/p_2$, across said expander;
   (f) calculating an estimate of a reduced power, $P_r=P/p_1\sqrt{ZRT_1}$, as a function of the pressure ratio, $R_c$, from the characteristic curve;
   (g) calculating an estimate of a power, $P=P_r p_1\sqrt{ZRT_1}$, corresponding to the estimated reduced power using the upstream pressure, $p_1$, and the upstream temperature, $T_1$; and
   (h) adjusting said control means to reduce the power generated by said hot gas expander, based on the calculated power, P.

2. The method of claim 1 wherein the step of determining an upstream temperature, $T_1$, is accomplished by estimating said temperature.

3. The method of claim 1 wherein the step of determining a downstream pressure, $p_2$, is accomplished by estimating said pressure.

4. A method for estimating the power produced by a power recovery system comprising a hot gas expander, a load, a means for controlling the power produced by said hot gas expander, and instrumentation, the method comprising the steps of:
   (a) determining a characteristic curve for said expander as a function of a reduced power, $P_r$;
   (b) determining a pressure, $p_1$, upstream of said expander and generating a signal proportional to the upstream pressure;
   (c) determining a temperature, $T_1$, upstream of said expander and generating a signal proportional to the upstream temperature;
   (d) determining a pressure differential, $\Delta p_o$, from a differential pressure flow-measurement device upstream or downstream of said expander and generating a signal proportional to the differential pressure;
   (e) calculating a reduced flow rate, $q_r=\Delta p_o/p_1$, for said expander;
   (f) calculating an estimate of a reduced power, $P_r=P/p_1\sqrt{ZRT_1}$, as a function of the reduced flow rate, $q_r$, from the characteristic curve;
   (g) calculating an estimate of a power, $P=P_r p_1\sqrt{ZRT_1}$, corresponding to the estimated reduced power using the upstream pressure, $p_1$, and the upstream temperature, $T_1$; and
   (h) adjusting said control means to reduce the power generated by said hot gas expander, based on the calculated power, P.

5. The method of claim 4 wherein the step of determining an upstream temperature, $T_1$, is accomplished by estimating said temperature.

6. The method of claims 1 or 4 wherein the power of the expander is used in a model used for model based control.

7. The method of claim 6 wherein the model based control is used for speed control.

8. The method of claim 6 wherein the model based control is used for load control.

9. A method for controlling a power recovery system comprising a hot gas expander, a load, and a control device when said load is suddenly shed, the method comprising the steps of:
   (a) calculating a power being produced by said expander;
   (b) calculating a new set point for said control device as a function of the power being produced by said expander and a power of the load that was shed; and
   (c) generating a control signal for said control device as a function of a new set point.

10. A method for controlling the rotational speed of a power recovery system comprising a hot gas expander, a load, means for controlling the power produced by said hot gas expander, and instrumentation when said load is partially or fully shed, the method comprising the steps of:
   (a) determining a characteristic curve for said expander as a function of a reduced power, $P_r$;
   (b) determining a pressure, $p_1$, upstream of said expander and generating a signal proportional to the upstream pressure;

(c) determining a temperature, $T_1$, upstream of said expander and generating a signal proportional to the upstream temperature;

(d) determining a pressure, $p_2$, downstream of said expander and generating a signal proportional to the downstream pressure;

(e) calculating a pressure ratio, $R_c=p_1/p_2$, across said expander;

(f) calculating the reduced power, $P_r=P/p_1\sqrt{ZRT_1}$, as a function of the pressure ratio, Rc, from the characteristic curve;

(g) calculating a power, $P=P_r p_1\sqrt{ZRT_1}$, corresponding to the reduced power using the upstream pressure, $p_1$, and the upstream temperature, $T_1$;

(h) calculating a new set point for said control means based on the power shed by the load and the power produced by the expander; and (i) generating a control signal for said control means based on the new set point.

11. A method for estimating the power produced by a power recovery system comprising a hot gas expander, a load, a means for controlling the power produced by said hot gas expander, and instrumentation, the method comprising the steps of:

(a) determining a characteristic curve for said expander as a function of a reduced power, $P_r$;

(b) determining a pressure, $p_1$, upstream of said expander and generating a signal proportional to the upstream pressure;

(c) determining a temperature, $T_1$, upstream of said expander and generating a signal proportional to the upstream temperature;

(d) determining a pressure differential, $\Delta p_o$, from a differential pressure flow-measurement device upstream or downstream of said expander and generating a signal proportional to the differential pressure;

(e) calculating a reduced flow rate, $q_r=\Delta p_o/p_1$, for said expander;

(f) calculating an estimate of a reduced power, $P_r=P/p_1\sqrt{ZRT_1}$, as a function of the reduced flow rate, $q_r$, from the characteristic curve;

(g) calculating an estimate of a power, $P=P_r p_1\sqrt{ZRT_1}$, corresponding to the estimated reduced power using the upstream pressure, $p_1$, and the upstream temperature, $T_1$;

(h) calculating a new set point for said control means based on the power shed by the load and the estimated power produced by the expander; and (i) generating a control signal for said control means based on the new set point.

12. A method for controlling a power recovery system comprising a hot gas expander, a load, a control means when said load is suddenly shed, the method comprising the step of:

(a) setting said control means to a predetermined value, said value being a function of the power of the load that is shed.

13. A method for controlling a power recovery system comprising a hot gas expander, a load, a control means when said load is suddenly shed, the method comprising the steps of:

(a) determining a power of the load that was shed; and (b) decrementing said control means by a predetermined value, said value being a function of said shed load.

14. A method for estimating the power produced by a power recovery system comprising a turbo expander, a load, a means for controlling the power produced by said hot gas expander, and instrumentation, the method comprising the steps of:

(a) determining a temperature at the inlet ($T_1$) of said expander and generating a signal proportional to said inlet temperature;

(b) determining a temperature at the outlet ($T_2$) of said expander and generating a signal proportional to said outlet temperature;

(c) determining a mass flow rate ($\dot{m}$) through the expander and generating a signal proportional to said mass flow rate;

(d) calculating a temperature difference between the inlet and outlet temperatures: $\Delta T=T_1-T_2$;

(e) calculating an estimate of a power produced by said expander based on a constant times the mass flow times the temperature difference: $P=C\dot{m}\Delta T$; and (f) adjusting said control means to reduce the power generated by said hot gas expander, based on the estimated power, P.

15. A method for estimating the power produced by a power recovery system comprising a turbo expander, a load, a means for controlling the power produced by said hot gas expander, and instrumentation, the method comprising the steps of:

(a) determining a temperature at the inlet ($T_1$) of said expander and generating a signal proportional to said inlet temperature;

(b) calculating an estimate of a specific enthalpy ($h_1$) at the inlet of said expander as a function of the inlet temperature;

(c) determining a temperature at the outlet ($T_2$) of said expander and generating a signal proportional to said outlet temperature;

(d) calculating an estimate of a specific enthalpy ($h_2$) at the outlet of said expander as a function of the outlet temperature;

(e) determining a mass flow rate ($\dot{m}$) through the expander and generating a signal proportional to said mass flow rate;

(f) calculating an estimate of a power based on the mass flow rate, an efficiency $\eta$, and the difference between the estimated inlet and outlet enthalpies: $P=\dot{m}\eta(h_1-h_2)$; and (g) adjusting said control means to reduce the power generated by said hot gas expander, based on the calculated power, P.

16. A method for estimating the power produced by a power recovery system comprising a turbo expander, a load, a means for controlling the power produced by said hot gas expander, and instrumentation, the method comprising the steps of:

(a) determining a temperature at the inlet ($T_1$) of said expander and generating a signal proportional to said inlet temperature;

(b) determining a pressure at the inlet ($p_1$) of said expander and generating a signal proportional to said inlet pressure;

(c) calculating an estimate of a specific enthalpy ($h_1$) at the inlet of said expander as a function of the inlet temperature and inlet pressure;

(d) determining a temperature at the outlet ($T_2$) of said expander and generating a signal proportional to said outlet temperature;

(e) determining a pressure at the outlet ($p_2$) of said expander and generating a signal proportional to said outlet pressure;

(f) calculating an estimate of a specific enthalpy ($h_2$) at the outlet of said expander as a function of the outlet temperature and outlet pressure;

(g) determining a mass flow rate ($\dot{m}$) through the expander and generating a signal proportional to said mass flow rate;

(h) calculating an estimate of a power based on the mass flow rate, an efficiency $\eta$, and the difference between the estimated inlet and outlet enthalpies: $P = \dot{m}\eta(h_1-h_2)$; and (i) adjusting said control means to reduce the power generated by said hot gas expander, based on the calculated power, P.

17. The method of claims 14, 15, or 16 whereby the mass flow rate is calculated based on a pressure ratio across the expander, a pressure measurement, and a temperature measurement, the method comprising the steps of:

(a1) determining a pressure at the inlet ($p_1$) of said expander and generating a signal proportional to said inlet pressure;

(b1) determining a temperature at the inlet ($T_1$) of said expander and generating a signal proportional to said inlet temperature;

(c1) determining a pressure at the outlet ($p_2$) of said expander and generating a signal proportional to said outlet pressure;

(d1) calculating the pressure ratio across the expander ($R_c$) by dividing the outlet pressure into the inlet pressure ($p_1/p_2$);

(e1) determining a characteristic curve for the expander as a function of the pressure ratio;

(f1) calculating a reduced flow rate ($q_r$) as a function of the pressure ratio using the characteristic curve of the expander; and (g1) calculating the mass flow rate by multiplying said reduced flow rate by said inlet pressure, $p_1$, dividing by said inlet temperature, $T_1$, taking the square root, and multiplying by a constant.

18. The method of claims 14, 15, or 16 whereby the mass flow rate is calculated, based on a differential pressure flow-measurement device, a pressure measurement, and a temperature measurement, the method comprising the steps of:

(a1) determining a differential pressure ($\Delta p_o$) across a flow measurement device and generating a signal proportional to said differential pressure;

(b1) determining a pressure (p) in the neighborhood of said flow measurement device and generating a signal proportional to said pressure;

(c1) determining a temperature (T) in the neighborhood of said flow measurement device and generating a signal proportional to said temperature; and (d1) calculating the mass flow rate as a function of the differential pressure signal, the pressure signal, and the temperature signal.

19. The method of claim 18 whereby the step of calculating the mass flow rate comprises the steps of:

(a2) calculating an intermediate value by taking the product of the differential pressure signal and the pressure signal, and dividing said product by said temperature signal; and (b2) taking a square root of said intermediate value and multiplying said square root by a constant.

20. A method for estimating the power produced by a power recovery system comprising a hot gas expander, a load, a means for controlling the power produced by said hot gas expander, and instrumentation, the method comprising the steps of:

(a) determining a characteristic curve for said expander as a function of a reduced power, $P_r$;

(b) determining a pressure, $p_1$, upstream of said expander and generating a signal proportional to the upstream pressure;

(c) determining a temperature, $T_1$, upstream of said expander and generating a signal proportional to the upstream temperature;

(d) determining a temperature, $T_2$, downstream of said expander and generating a signal proportional to the downstream temperature;

(e) calculating a temperature ratio, $R_r = T_1/T_2$, across said expander;

(f) calculating an estimate of a reduced power, $P_r = P/p_1\sqrt{ZRT_1}$, as a function of the temperature ratio, $R_r$, from the characteristic curve;

(g) calculating an estimate of a power, $P = P_r p_1 \sqrt{ZRT_1}$, corresponding to the estimated reduced power using the upstream pressure, $p_1$, and the upstream temperature, $T_1$; and (h) adjusting said control means to reduce the power generated by said hot gas expander, based on the estimated power, P.

21. A method for controlling the rotational speed of a power recovery system comprising a hot gas expander, a load, means for controlling the power produced by said hot gas expander, and instrumentation when said load is partially or fully shed, the method comprising the steps of:

(a) determining a characteristic curve for said expander as a function of a reduced power, $P_r$;

(b) determining a pressure, $p_1$, upstream of said expander and generating a signal proportional to the upstream pressure;

(c) determining a temperature, $T_1$, upstream of said expander and generating a signal proportional to the upstream temperature;

(d) determining a temperature, $T_2$, downstream of said expander and generating a signal proportional to the downstream temperature;

(e) calculating a temperature ratio, $R_r = T_1/T_2$, across said expander;

(f) calculating the reduced power, $P_r = P/p_1\sqrt{ZRT_1}$, as a function of the temperature ratio, $R_r$, from the characteristic curve;

(g) calculating a power, $P = P_r\, p_1\sqrt{ZRT_1}$, corresponding to the reduced power using the upstream pressure, $p_1$, and the upstream temperature, $T_1$;

(h) calculating a new set point for the control means based on the power shed by the load and the power produced by the expander; and (i) generating a control signal for said control means based on a new set point.

22. An apparatus for estimating the power produced by a power recovery system comprising a hot gas expander, a load, a means for controlling the power produced by said hot gas expander, and instrumentation, the apparatus comprising:

(a) means for determining a characteristic curve for said expander as a function of a reduced power, $P_r$;

(b) means for determining a pressure, $p_1$, upstream of said expander and generating a signal proportional to the upstream pressure;

(c) means for determining a temperature, $T_1$, upstream of said expander and generating a signal proportional to the upstream temperature;

(d) means for determining a pressure, $p_2$, downstream of said expander and generating a signal proportional to the downstream pressure;

(e) means for calculating a pressure ratio, $R_c = p_1/p_2$, across said expander;

(f) means for calculating an estimate of a reduced power, $P_r = P/p_1 \sqrt{ZRT_1}$, as a function of the pressure ratio, $R_c$, from the characteristic curve;

(g) means for calculating an estimate of a power, $P = P_r p_1 \sqrt{ZRT_1}$, corresponding to the estimated reduced power using the upstream pressure, $p_1$, and the upstream temperature, $T_1$; and (h) means for adjusting said control means to reduce the power generated by said hot gas expander, based on the calculated power, $P$.

23. The apparatus of claim 22 wherein the means for determining an upstream temperature, $T_1$, is accomplished by estimating said temperature.

24. The apparatus of claim 22 wherein the means for determining a downstream pressure, $p_2$, is accomplished by estimating said pressure.

25. An apparatus for estimating the power produced by a power recovery system comprising a hot gas expander, a load, a means for controlling the power produced by said hot gas expander, and instrumentation, the apparatus comprising:

(a) means for determining a characteristic curve for said expander as a function of a reduced power, $P_r$;

(b) means for determining a pressure, $p_1$, upstream of said expander and generating a signal proportional to the upstream pressure;

(c) means for determining a temperature, $T_1$, upstream of said expander and generating a signal proportional to the upstream temperature;

(d) means for determining a pressure differential, $\Delta p_o$, from a differential pressure flow-measurement device upstream or downstream of said expander and generating a signal proportional to the differential pressure;

(e) means for calculating a reduced flow rate, $q_r = \Delta p_o/p_1$, for said expander;

(f) means for calculating an estimate of a reduced power, $P_r = P/p_1 \sqrt{ZRT_1}$, as a function of the reduced flow rate, $q_r$, from the characteristic curve;

(g) means for calculating an estimate of a power, $P = P_r p_1 \sqrt{ZRT_1}$, corresponding to the estimated reduced power using the upstream pressure, $p_1$, and the upstream temperature, $T_1$; and (h) means for adjusting said control means to reduce the power generated by said hot gas expander, based on the calculated power, $P$.

26. The apparatus of claim 25 wherein the means for determining an upstream temperature, $T_1$, is accomplished by estimating said temperature.

27. The apparatus of claims 22 or 25 wherein the power of the expander is used in a model used for model based control.

28. The apparatus of claim 27 wherein the model based control is used for speed control.

29. The apparatus of claim 27 wherein the model based control is used for load control.

30. An apparatus for controlling a power recovery system comprising a hot gas expander, a load, and control means when said load is suddenly shed, the apparatus comprising:

(a) means for calculating a power being produced by said expander;

(b) means for calculating a new set point for said control means as a function of the power being produced by said expander and a power of the load that was shed; and (c) means for generating a control signal for said control means based on a new set point.

31. An apparatus for controlling the rotational speed of a power recovery system comprising a hot gas expander, a load, means for controlling the power produced by said hot gas expander, and instrumentation when said load is partially or fully shed, the apparatus comprising:

(a) means for determining a characteristic curve for said expander as a function of a reduced power, $P_r$;

(b) means for determining a pressure, $p_1$, upstream of said expander and generating a signal proportional to the upstream pressure;

(c) means for determining a temperature, $T_1$, upstream of said expander and generating a signal proportional to the upstream temperature;

(d) means for determining a pressure, $p_2$, downstream of said expander and generating a signal proportional to the downstream pressure;

(e) means for calculating a pressure ratio, $R_c = p_1/p_2$, across said expander;

(f) means for calculating the reduced power, $P_r = P/p_1 \sqrt{ZRT_1}$, as a function of the pressure ratio, $R_c$, from the characteristic curve;

(g) means for calculating a power, $P = P_r p_1 \sqrt{ZRT_1}$, corresponding to the reduced power using the upstream pressure, $p_1$, and the upstream temperature, $T_1$;

(h) means for calculating a new set point for said control means based on the power shed by the load and the power produced by the expander; and (i) means for generating a control signal for said control means based on the new set point.

32. An apparatus for estimating the power produced by a power recovery system comprising a hot gas expander, a load, a means for controlling the power produced by said hot gas expander, and instrumentation, the apparatus comprising:

(a) means for determining a characteristic curve for said expander as a function of a reduced power, $P_r$;

(b) means for determining a pressure, $p_1$, upstream of said expander and generating a signal proportional to the upstream pressure;

(c) means for determining a temperature, $T_1$, upstream of said expander and generating a signal proportional to the upstream temperature;

(d) means for determining a pressure differential, $\Delta p_o$, from a differential pressure flow-measurement device upstream or downstream of said expander and generating a signal proportional to the differential pressure;

(e) means for calculating a reduced flow rate, $q_r = \Delta p_o/p_1$, for said expander;

(f) means for calculating an estimate of a reduced power, $P_r = P/p_1 \sqrt{ZRT_1}$, as a function of the reduced flow rate, $q_r$, from the characteristic curve;

(g) means for calculating an estimate of a power, $P=P_r p_1 \sqrt{ZRT_1}$, corresponding to the estimated reduced power using the upstream pressure, $p_1$, and the upstream temperature, $T_1$;

(h) means for calculating a new set point for said control means based on the power shed by the load and the estimated power produced by the expander; and (i) means for generating a control signal for said control means based on the new set point.

33. An apparatus for controlling a power recovery system comprising a hot gas expander, a load, and control means when said load is suddenly shed, the apparatus comprising:

(a) means for setting said control means to a predetermined value, said value being a function of the power of the load that is shed.

34. An apparatus for controlling a power recovery system comprising a hot gas expander, a load, and control means when said load is suddenly shed, the apparatus comprising:

(a) means for determining a power of the load that was shed; and (b) means for decrementing said control means by a predetermined value, said value being a function of said shed load.

35. An apparatus for estimating the power produced by a power recovery system comprising a turbo expander, a load, a means for controlling the power produced by said hot gas expander, and instrumentation, the apparatus comprising:

(a) means for determining a temperature at the inlet ($T_1$) of said expander and generating a signal proportional to said inlet temperature;

(b) means for determining a temperature at the outlet ($T_2$) of said expander and generating a signal proportional to said outlet temperature;

(c) means for determining a mass flow rate ($\dot{m}$) through the expander and generating a signal proportional to said mass flow rate;

(d) means for calculating a temperature difference between the inlet and outlet temperatures: $\Delta T = T_1 - T_2$;

(e) means for calculating an estimate of a power produced by said expander based on a constant times the mass flow times the temperature difference: $P = C \dot{m} \Delta T$; and (f) means for adjusting said control means to reduce the power generated by said hot gas expander, based on the estimated power, P.

36. An apparatus for estimating the power produced by a power recovery system comprising a turboexpander, a load, a means for controlling the power produced by said hot gas expander, and instrumentation, the apparatus comprising:

(a) means for determining a temperature at the inlet ($T_1$) of said expander and generating a signal proportional to said inlet temperature;

(b) means for calculating a specific enthalpy ($h_1$) at the inlet of said expander as a function of the inlet temperature;

(c) means for determining a temperature at the outlet ($T_2$) of said expander and generating a signal proportional to said outlet temperature;

(d) means for calculating a specific enthalpy ($h_2$) at the outlet of said expander as a function of the outlet temperature;

(e) means for determining a mass flow rate ($\dot{m}$) through the expander and generating a signal proportional to said mass flow rate;

(f) means for calculating an estimate of a power based on the mass flow rate, an efficiency, and the difference between the estimated inlet and outlet enthalpies: $P = \dot{m}\eta(h_1 - h_2)$; and (g) means for adjusting said control means to reduce the power generated by said hot gas expander, based on the calculated power, P.

37. An apparatus for estimating the power produced by a power recovery system comprising a turboexpander, a load, a means for controlling the power produced by said hot gas expander, and instrumentation, the apparatus comprising:

(a) means for determining a temperature at the inlet ($T_1$) of said expander and generating a signal proportional to said inlet temperature;

(b) means for determining a pressure at the inlet ($p_1$) of said expander and generating a signal proportional to said inlet pressure;

(c) means for calculating a specific enthalpy ($h_1$) at the inlet of said expander as a function of the inlet temperature and inlet pressure;

(d) means for determining a temperature at the outlet ($T_2$) of said expander and generating a signal proportional to said outlet temperature;

(e) means for determining a pressure at the outlet ($p_2$) of said expander and generating a signal proportional to said outlet pressure;

(f) means for calculating a specific enthalpy ($h_2$) at the outlet of said expander as a function of the outlet temperature and outlet pressure;

(g) means for determining a mass flow rate ($\dot{m}$) through the expander and generating a signal proportional to said mass flow rate;

(h) means for calculating an estimate of a power based on the mass flow rate, an efficiency $\eta$, and the difference between the estimated inlet and outlet enthalpies: $P = \dot{m}\eta(h_1 - h_2)$; and (i) means for adjusting said control means to reduce the power generated by said hot gas expander, based on the calculated power, P.

38. The apparatus of claims 35, 36, or 37 whereby the mass flow rate is calculated based on a pressure ratio across the expander, a pressure measurement, and a temperature measurement, the apparatus comprising:

(a1) means for determining a pressure at the inlet ($p_1$) of said expander and generating a signal proportional to said inlet pressure;

(b1) means for determining a temperature at the inlet ($T_1$) of said expander and generating a signal proportional to said inlet temperature;

(c1) means for determining a pressure at the outlet ($p_2$) of said expander and generating a signal proportional to said outlet pressure;

(d1) means for calculating the pressure ratio across the expander ($R_c$) by dividing the outlet pressure into the inlet pressure ($p_1/p_2$);

(e1) means for determining a characteristic curve for the expander as a function of the pressure ratio;

(f1) means for calculating a reduced flow rate ($q_r$) as a function of the pressure ratio using the characteristic curve of the expander; and (g1) means for calculating the mass flow rate by multiplying said reduced flow rate by said inlet pressure, $p_1$, dividing by said inlet temperature, $T_1$, taking the square root, and multiplying by a constant.

39. The apparatus of claims 35, 36, or 37 whereby the mass flow rate is calculated, based on a differential pressure flow-measurement device, a pressure measurement, and a temperature measurement, the apparatus comprising:

(a1) means for determining a differential pressure ($\Delta p_o$) across a flow measurement device and generating a signal proportional to said differential pressure;

(b1) means for determining a pressure (p) in the neighborhood of said flow measurement device and generating a signal proportional to said pressure;

(c1) means for determining a temperature (T) in the neighborhood of said flow measurement device and generating a signal proportional to said temperature; and (d1) means for calculating the mass flow rate as a function of the differential pressure signal, the pressure signal, and the temperature signal.

40. The apparatus of claim 39 whereby the means for calculating the mass flow rate comprises:

(a2) means for calculating an intermediate value by taking the product of the differential pressure signal and the pressure signal, and dividing said product by said temperature signal; and (b2) means for taking a square root of said intermediate value and multiplying said square root by a constant.

41. An apparatus for estimating the power produced by a power recovery system comprising a hot gas expander, a load, a means for controlling the power produced by said hot gas expander, and instrumentation, the apparatus comprising:

(a) means for determining a characteristic curve for said expander as a function of a reduced power, $P_r$;

(b) means for determining a pressure, $p_1$, upstream of said expander and generating a signal proportional to the upstream pressure;

(c) means for determining a temperature, $T_1$, upstream of said expander and generating a signal proportional to the upstream temperature;

(d) means for determining a temperature, $T_2$, downstream of said expander and generating a signal proportional to the downstream temperature;

(e) means for calculating a temperature ratio, $R_t = T_1/T_2$, across said expander;

(f) means for calculating an estimate of a reduced power, $P_r = P/p_1\sqrt{ZRT_1}$, as a function of the temperature ratio, $R_t$, from the characteristic curve;

(g) means for calculating an estimate of a power, $P = P_r p_1 \sqrt{ZRT_1}$, corresponding to the estimated reduced power using the upstream pressure, $p_1$, and the upstream temperature, $T_1$; and (h) means for adjusting said control means to reduce the power generated by said hot gas expander, based on the estimated power, P.

42. An apparatus for controlling the rotational speed of a power recovery system comprising a hot gas expander, a load, means for controlling the power produced by said hot gas expander, and instrumentation when said load is partially or fully shed, the apparatus comprising:

(a) means for determining a characteristic curve for said expander as a function of a reduced power, $P_r$;

(b) means for determining a pressure, $p_1$, upstream of said expander and generating a signal proportional to the upstream pressure;

(c) means for determining a temperature, $T_1$, upstream of said expander and generating a signal proportional to the upstream temperature;

(d) means for determining a temperature, $T_2$, downstream of said expander and generating a signal proportional to the downstream temperature;

(e) means for calculating a temperature ratio, $R_t = T_1/T_2$, across said expander;

(f) means for calculating the reduced power, $P_r = P/p_1\sqrt{ZRT_1}$, as a function of the temperature ratio, $R_t$, from the characteristic curve;

(g) means for calculating a power, $P = P_r p_1 \sqrt{ZRT_1}$, corresponding to the reduced power using the upstream pressure, $p_1$, and the upstream temperature, $T_1$;

(h) means for calculating a new set point for the control means based on the power shed by the load and the power produced by the expander; and (i) means for generating a control signal for said control means based on a new set point.

* * * * *